(12) United States Patent
Knoblich

(10) Patent No.: US 6,822,790 B2
(45) Date of Patent: Nov. 23, 2004

(54) LIGHTING SYSTEM FOR A STEREOMICROSCOPE

(75) Inventor: Johannes Knoblich, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/462,961

(22) PCT Filed: May 5, 1999

(86) PCT No.: PCT/EP97/03070
§ 371 (c)(1),
(2), (4) Date: Apr. 10, 2000

(87) PCT Pub. No.: WO99/60437
PCT Pub. Date: Nov. 25, 1999

(65) Prior Publication Data
US 2002/0109912 A1 Aug. 15, 2002

(30) Foreign Application Priority Data
May 18, 1998 (DE) ........................ 198 22 255

(51) Int. Cl.⁷ .............................. G02B 21/06
(52) U.S. Cl. ................. 359/385; 359/376; 359/380
(58) Field of Search ............... 359/372, 373, 359/374, 375, 376, 377, 385, 387, 390, 379, 380

(56) References Cited

U.S. PATENT DOCUMENTS 5,140,458 A * 8/1992 Takagi et al. ............... 359/380
5,434,703 A * 7/1995 Morizumi .................... 359/385
5,570,228 A * 10/1996 Greenberg ................... 359/389
5,973,829 A * 10/1999 Moller et al. ................ 359/389

FOREIGN PATENT DOCUMENTS

| CH | 664 025 A5 | 1/1988 |
| DE | 34 27 592 C2 | 9/1987 |
| DE | 43 31 635 | 6/1994 |
| DE | 94 08 066 | 10/1994 |
| DE | G 94 08 066.6 | 11/1994 |
| EP | 0 723 175 | 7/1996 |
| EP | 0 793 128 | 9/1997 |

OTHER PUBLICATIONS

English Abstract of G 94 08 066.6.
English Abstract of CH 664 025 A5.
English Abstract of DE 34 27 592 C2.

* cited by examiner

Primary Examiner—Mark A. Robinson
(74) Attorney, Agent, or Firm—Reed Smith LLP

(57) ABSTRACT

Illumination arrangement for a stereo microscope, preferably a Greenough type stereo microscope, comprising at least one, preferably two illumination channels which are arranged in a plane which is arranged essentially orthogonally with respect to the plane of the two observation channels, preferably with two light channels in the interior of the microscope housing outside of the observation beam paths, wherein the light channels are guided around the observation optics.

18 Claims, 5 Drawing Sheets

LIGHTING SYSTEM FOR A STEREOMICROSCOPE

BACKGROUND OF THE INVENTION

1. Field of the Invention

The invention relates to an illumination arrangement for a stereo microscope.

2. Description of the Related Art

In stereo microscopy, external incident illumination arrangements in which direct illumination is arranged outside the microscope base body belong to prior art.

Such arrangements can be halogen lamps with reflector mirrors which are fastened to the stereo microscope support, to the pillar or to the stereo microscope base body itself and enable oblique incident illumination.

Cold-light illumination arrangements which are arranged, for example, at the pillar or at the stereo microscope support are known and are constructed, for instance, as flexible or semirigid one-armed or multiple-armed light guides with focusing optics. Without fastening to the stereo microscope base body or to the stand, there are one-armed or multiple-armed, semirigid goosenecks, as they are called, which are fastened exclusively to the cold-light source and can be optionally positioned spatially.

Further, cold-light ring lamps which are attachable to the front area of the stereo microscope are known and available, e.g., as 4-point ring lamps or slit ring lamps in different diameters and radiating angles. All of these external incident illumination arrangements ensure a highly differentiated incident illumination, i.e., the object examined through the stereo microscope can be optimally illuminated corresponding to its surface structure and spatial extension. A disadvantage in these external illumination arrangements is that they sometimes occupy considerable space in the object region, i.e., direct viewing of the object and free space for manipulation is sometimes severely limited.

A further disadvantage in these external illumination arrangements consists in that when the stereo microscope is fastened in special stands (e.g., machine holders, floor or wall stands) and as a result of the free spatial positioning of the stereo microscope which this involves, the light must first always be "tracked" separately (insofar as the illumination arrangement is not fastened to the stereo microscope base body itself). The disadvantages mentioned above can be avoided if the illumination arrangement itself can be successfully integrated in the stereo microscope base body in a suitable manner so as to save as much space as possible.

A number of different suggestions for solving this problem, some of them already published, with the aim of suitably integrating illumination systems directly in optical instruments (for example, in photographic cameras, video cameras, camcorders, microscopes, stereo microscopes, operation microscopes) are known internationally.

In stereo microscopy, internal incident illumination arrangements in which the light is coupled into (coaxial incident light principle) the observation channels via suitable beam splitting elements (prisms, splitter mirrors) inside the microscope base body are known from the prior art. In this connection, light can be generated by a conventional microscope incident light arrangement or via a cold-light source and light guides and can be transported until it is coupled into the observation channels via the above-mentioned beam splitting elements at different locations (e.g., above or below the stereo microscope pancratic or zoom system). Aside from the above-mentioned coaxial illumination arrangements which are fixedly integrated in the stereo microscope base body, there are also modular units which can be arranged, for example, in such a way that they can be divided between the stereo microscope pancratic system and the main objective (e.g., Zeiss telescope type stereo microscope with modular coaxial illumination device and flexible light guide input coupling, light guide connection to Schott cold-light source KL 1500). An advantage in the coaxial illumination arrangement is that the light is "guided along" with the stereo microscope base body and, in case of internal coupling in above the stereoscopic pancratic system, that there is an exact adaptation of the object field during zoom magnification. With internal coupling in below the stereoscopic pancratic system, the size of the illuminated object field is constant and is designed for the maximum object field that can be achieved with the pancratic system. A disadvantage in all of the above-mentioned arrangements with the coaxial incident light principle is the occurrence of strong reflections—especially with highly reflective object surfaces—and a resulting deterioration in image contrast through the coupling of light into the observation channels. The various possible arrangements for suppression of reflections with polarizing-optical means (e.g., antireflection device for Zeiss telescope type stereo microscopes) are also prior art. Known reflection suppression arrangements with polarizing-optical means have their own disadvantage in that a considerable reduction in illumination intensity occurs due to the high absorptive power of the at least two polarizing filters that are required. Other internal incident illumination arrangements which are modified from this basic principle and employed in telescope type stereo microscopes use only the front main objective for coupling light into the observation beam paths or into an azimuthal plane of incidence different from the observation channels. In these arrangements which are modified from the basic principle, there also remains the problem of the formation of reflections and elimination thereof with polarizing-optical means. In stereo microscopy, the coaxial incident light principle is preferably applied only with planar or flat specimens (shallow depth of field) because, with this vertical illumination, only a poor contrast or a poor spatial visual impression can be achieved in case of objects with depth of field or objects with surface relief; a substantially improved contrast and spatial impression can be achieved by the shadow effect occurring with oblique illumination. The different internal illumination arrangements working in accordance with the coaxial incident light principle which were described above are used in conventional stereo microscopes (telescope type construction), operation microscopes, in medical equipment with stereoscopic observation (colposcopes, slit lamps) or sometimes in endoscopes.

The laid open application DE 196 40 352 A1, "Internal Illumination Device and Video Microscope System", describes an arrangement for coupling in light via beam splitting as is known in conventional brightfield incident light microscopy. Another arrangement provides integration of direct illumination (lamp with reflector mirrors) in a video device; in this case, light is transmitted via light guides into the object space with oblique illumination and there is a repeated coupling of light into the observation channel by light guides via beam splitting (coaxial incident light principle). The proposed integrated illumination arrangements which are known in part from the prior art are directed only to the combination of video microscope system with video equipment.

U.S. Pat. No. 4,783,159, "Operation Microscope", describes a telescope type operation microscope with an integrated internal illumination arrangement for illuminating the operating field. In this connection, the light is principally coupled in between the zoom system (pancratic system) and the main objective. The illumination system which is separately constructed in the operation microscope illuminates the operating field via the following optical elements: light guide→separate zoom system→projection lens→main objective. Through the use of different optical deflecting elements (reflection prisms), it is possible to illuminate the operating field via the main objective at different locations (axially or extra-axially, as desired), resulting in differentiated illumination of the operating field (e.g., the eye).

Patent EP 0 793 128 A1, "Illumination Structure in Microscope", describes a microscope (stereoscope in a parallel construction/macroscope) in which an internal illumination system is arranged behind the objective. Different arrangements are described by which light can be coupled in behind the objective, for example, on the optical axis of the objective between the observation channels (two pairs) with one illumination channel, between the observation channel pairs with two or more illumination channels, or coupling in light using areas of the observation optics separated by mounts.

Patent DE 39 06 555 A1, "Incident Light Object Illumination Device", describes an (external) illumination device which is arranged at an observation device and which comprises a plurality of individual light sources (e.g., self-luminous objects, glass fibers or back-lighting diaphragms) which are also switchable individually and which are arranged in an at least two-dimensional array whose center coincides with the optical axis of the observation imaging optics.

The patent "Epidark Illumination System" DE 39 29 768 A1 describes an Epidark illumination system, preferably for reflected light microscopes, in which light coming from a light source is guided between a sleeve and an objective lens for illuminating an object (arrangement similar to that in incident light darkfield arrangements). A very flat illumination of the object field can be achieved with this ring-shaped illumination arrangement.

Patent EP 0 50 940 A2, "Microscope Illuminating Apparatus", shows different microscope illumination arrangements for incident light brightfield and darkfield illumination and for transmitted light brightfield and darkfield illumination in which the coupling of light into the illumination-optical systems is carried out by fiber-optics among other means.

Patent DE 19523712 A1, "Stereo Microscope", describes a stereo microscope (telescope construction) which has an observation front lens and an illumination lens that are separate from one another. A beam of observation light emitted by an object point is directed parallel by the focusable front observation lens. The illumination lens projects a beam of illumination light onto the object point. A position to be illuminated can be changed corresponding to the movement of an object point by the arrangement/focusing of the observation and illumination lens. It is the object of this special arrangement to achieve illumination which is as coaxial as possible, i.e., to adjust the smallest possible angle between the optical axis of the illumination light and optical axis of the observation light (prevention of reflections).

OBJECT AND SUMMARY OF THE INVENTION

It is the primary object of the invention to realize the illumination arrangement for stereo microscopes so as to have a minimum space requirement, but in such a way that the basic optical-mechanical construction is influenced only minimally and a bright, homogenous and reflection-free illumination of the maximum visible object field is made possible independent from the position and observation direction of the stereo microscope.

This object is met in an illumination arrangement for a stereo microscope, preferably a Greenough type stereo microscope, comprising at least one, preferably two, illumination channels which are arranged in a plane which is arranged essentially orthogonally with respect to the plane of the two reservation channels, preferably with two light channels in the interior of the microscope housing outside of the observation beam paths, wherein the light channels are guided around the observation optics.

The invention will be explained more fully in the following with reference to the schematic drawings.

DESCRIPTION OF THE PREFERRED EMBODIMENTS

An arrangement satisfying the objective stated above is achieved in that a fiber-optic illumination arrangement which is completely separate from the observation beam paths and has focusing optics is integrated in the stereo microscope base body, preferably through the arrangement of two spots in a plane orthogonal to the observation plane.

Figure 1:
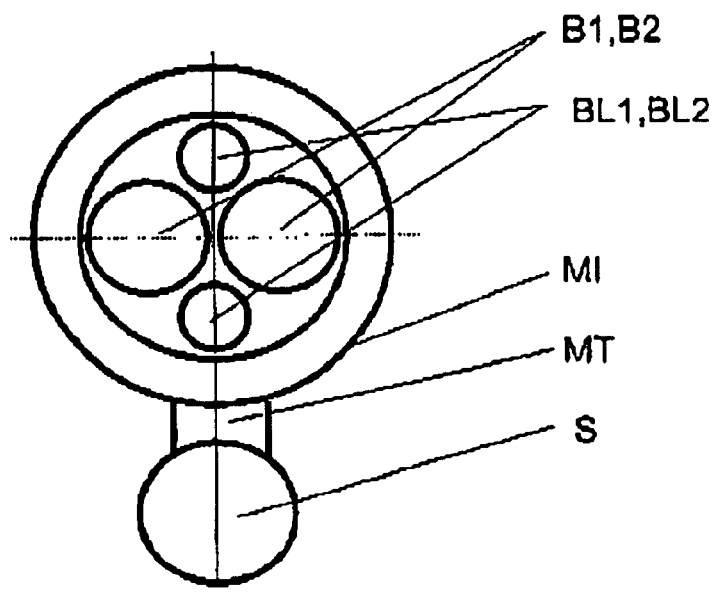
FIG. 1 shows a bottom view of a stereo microscope according to the invention.

In FIGS. 1, B1 and B2 represent the outlet openings or objective ends of two observation channels of a Greenough stereo microscope MI in the direction of the object. The microscope MI is connected with a stand S by a microscope support MT. The outlet openings BL1, BL2 of two light sources are arranged vertical to the connecting axis of the observation channels.

Figure 4:
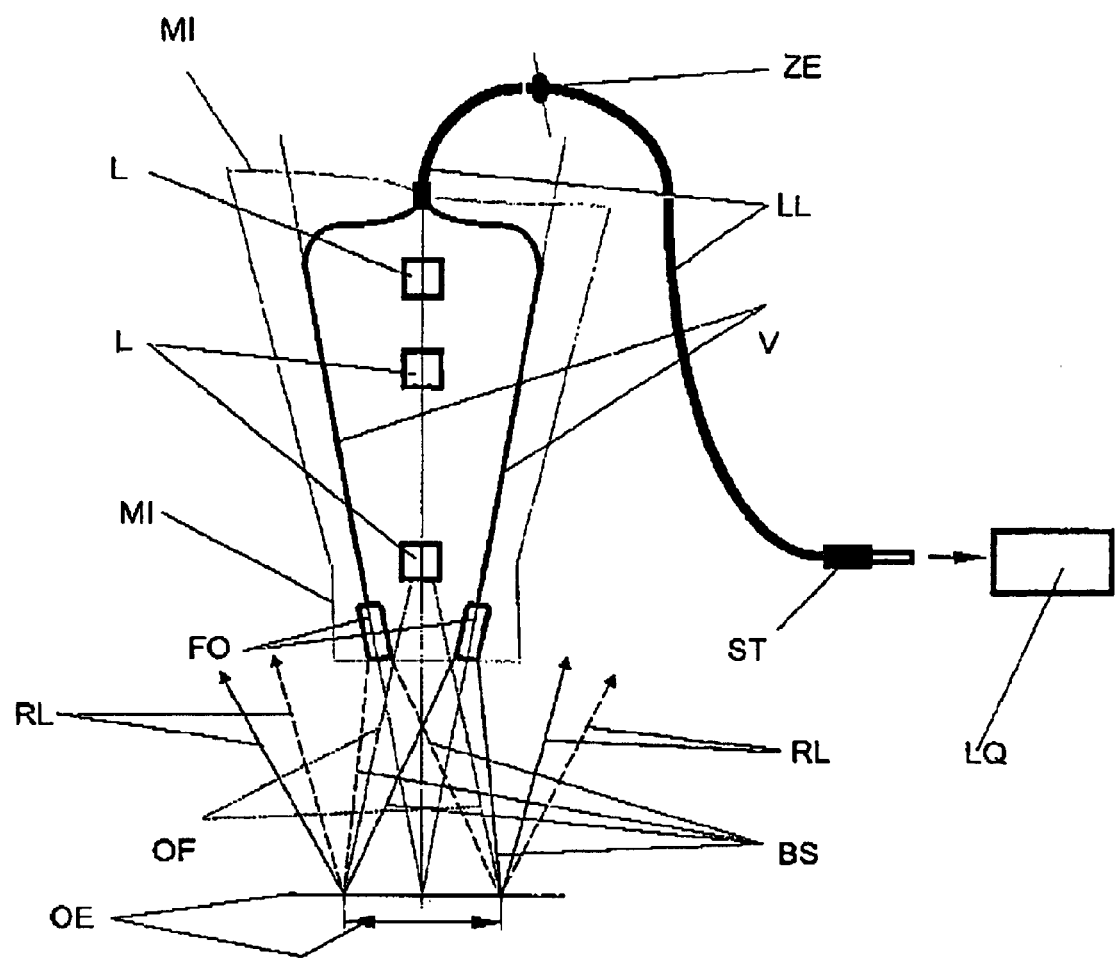
FIG. 4 shows a side view vertical to the side view according to FIG. 3.
Figure 5:
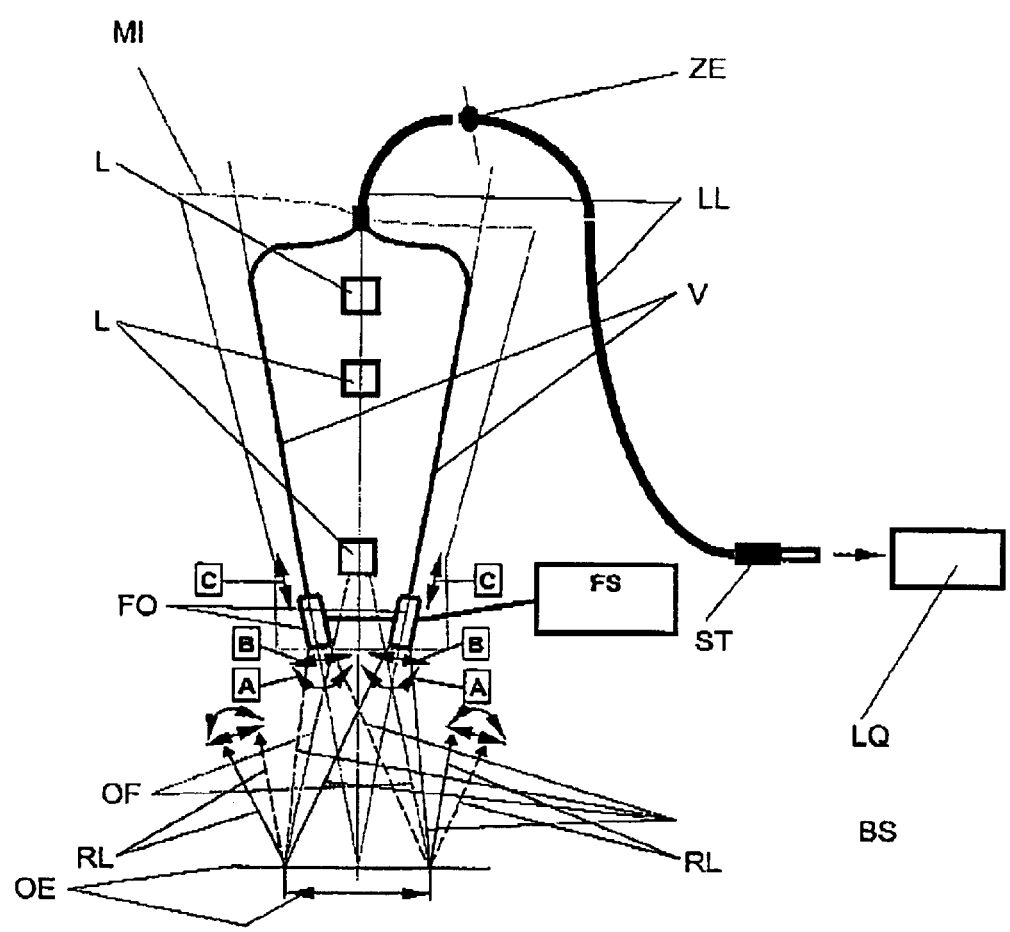
FIG. 5 shows advantageous possible adjustments for illumination.

As a result of this orthogonal arrangement of the illumination channels, a bothersome imaging of the illumination channel after reflection in the object plane (critical in the case of highly reflective objects) in the second observation channel and a resulting deterioration in contrast are prevented. Further, in order to prevent reflections in the entire stereo microscope zoom range in case of highly reflective objects and to improve stereoscopic contrast, the illumination arrangement, as is shown in FIGS. 4, 5, is advantageously arranged at an angle ≠0°, i.e., at an angle of ≈10° . . . 12° (≡half-angle to center) to the optical axis of the microscope. Focussing optics FO which are arranged in front of the light guides and which light the object plane can be constructed as stationary systems (lighting of the maximum object field diameter) and, in principle, also as zoom systems (e.g., mechanically coupled with the observation zoom system) with variable object field diameter.

Figure 2:
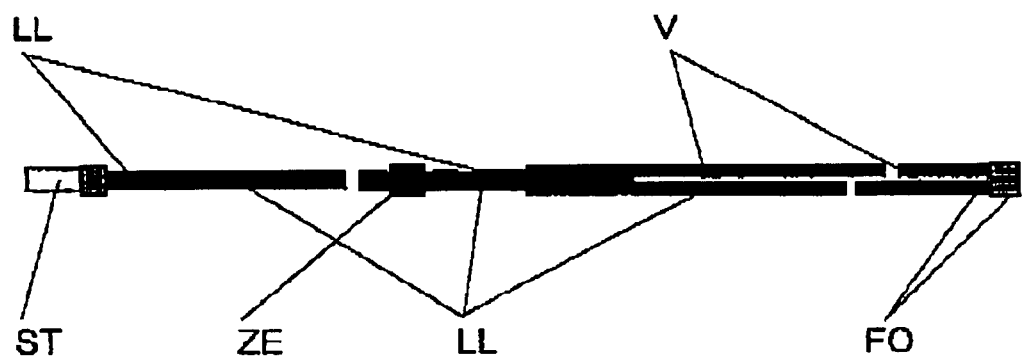
FIG. 2 shows the light guide used according to the invention.

In order to achieve a maximum illumination intensity in the object plane, it is advantageous when the illumination is carried out via a twin light guide LL (see FIG. 2) provided with focusing optics FO and a superposition of the two individual spots takes place in the object plane. The two individual fiber bundles of branch V of the flexible twin light guide LL are joined inside the stereo microscope base body and exit as a continuous (prevention of light losses) one-arm, flexible light guide—provided with a sufficient length—via a strain relief ZE at a suitable location on the stereo microscope base body. The light guide is then connected with an external cold-light source LQ via a standardized end piece ST. Glass light guides or plastic light guides or fluid light guides (especially advantageous in fluorescence illumination arrangements—see also FIG. 6) can be used as flexible light guides.

Figure 3:
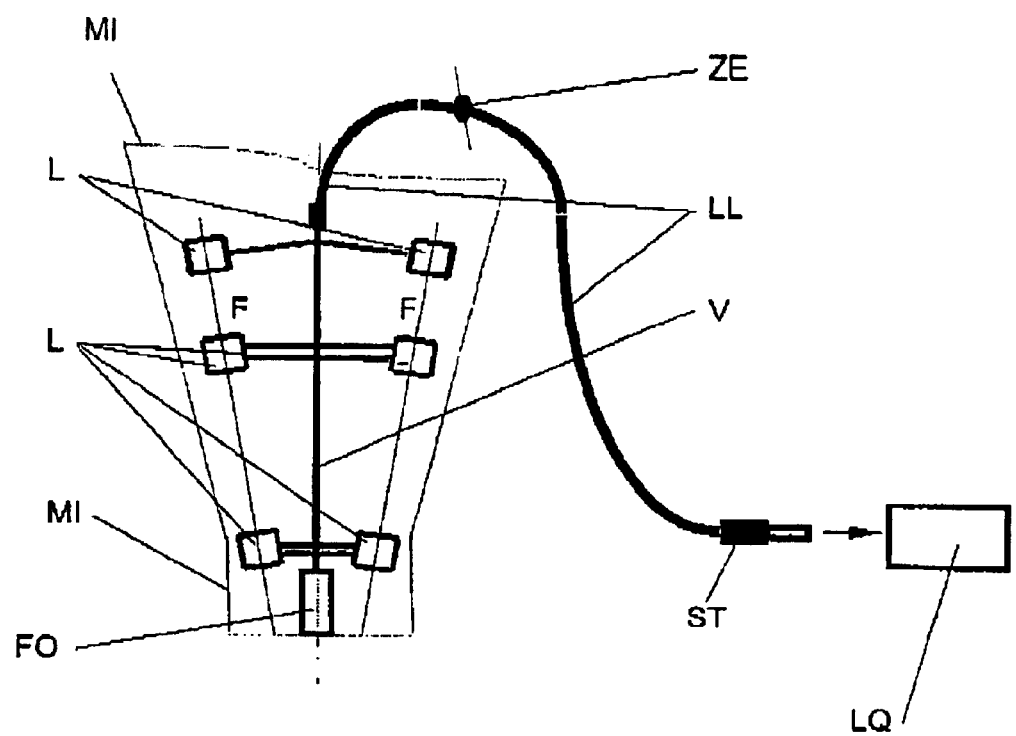
FIG. 3 shows a schematic side view in section.

A possible arrangement of the integrated fiber-optic illumination arrangement in a Greenough type stereo microscope in a plane parallel to that of the observation channels (sectional view through an illumination channel) is shown in FIG. 3. The microscope MI is only indicated in dashed lines without the tube. The light guide LL is coupled into the microscope housing from above and has a strain relief ZE. Its branched part V advantageously extends entirely in the interior of the microscope housing between the lens groups L of the zoom system of the microscope; these lens groups L are movable on guides F and are partially stationary without the observation beam paths being vignetted in this way.

FIG. 4 shows that the two light guide ends provided with focussing optics FO form an angle to the optical axis of the microscope and accordingly advantageously overlap with respect to their illumination spots BS, so that a uniform bright illumination of the object in the object plane OE is achieved over the entire maximum object field OF.

This illumination principle is suited to Greenough type stereo microscopes and, in principle, for telescope type stereo microscopes. In order to prevent reflections (disadvantage of the known coaxial stereo microscope illumination arrangements), illumination can also be realized outside of auxiliary lens systems (Greenough systems) and objectives (telescope systems, typical illumination arrangements for operation microscopes). A stationary installation of the illumination focusing optics provides optimal illumination of the object field for the stereo microscope without an auxiliary system (Greenough construction) or only for an auxiliary system/objective. A displacement and swiveling of the illumination focusing optics by mechanical guide elements and adjusting elements is required for adapting to different objectives/auxiliary systems). This is shown in FIG. 5.

Illumination optics FO which can be swiveled, displaced radially and focused in different directions via operator controls are shown here. The illumination focusing, i.e., the variable adaptation of the illumination spot to the observable object field diameter, is realized by a focusing control FS which is either mechanically coupled with the observation zoom system or is carried out electronically via motor.

Different advantageous variants are described in the following:

A swiveling of the illumination focusing optics (varying the angle of incidence of the light spots in connection with B), actuation by suitable external operator controls;

B radial displacement of illumination focusing optics (varying the angle of incidence of the light spots in connection with A), actuation by suitable external operator controls;

C varying illuminated object field diameter by focusing; varying the distance between the light guide output and focusing optics with manual actuation or light-guide coupling into a separate illumination zoom system which is positively coupled mechanically with the observation zoom or is actuated by a motor-driven external control FS.

For this purpose, the illumination focusing system can advantageously be coupled with the zoom drive of the stereo microscope mechanically or electrically, i.e., the illuminated object field diameter is automatically variably adapted with actuation of the observation zoom system.

Figure 6:
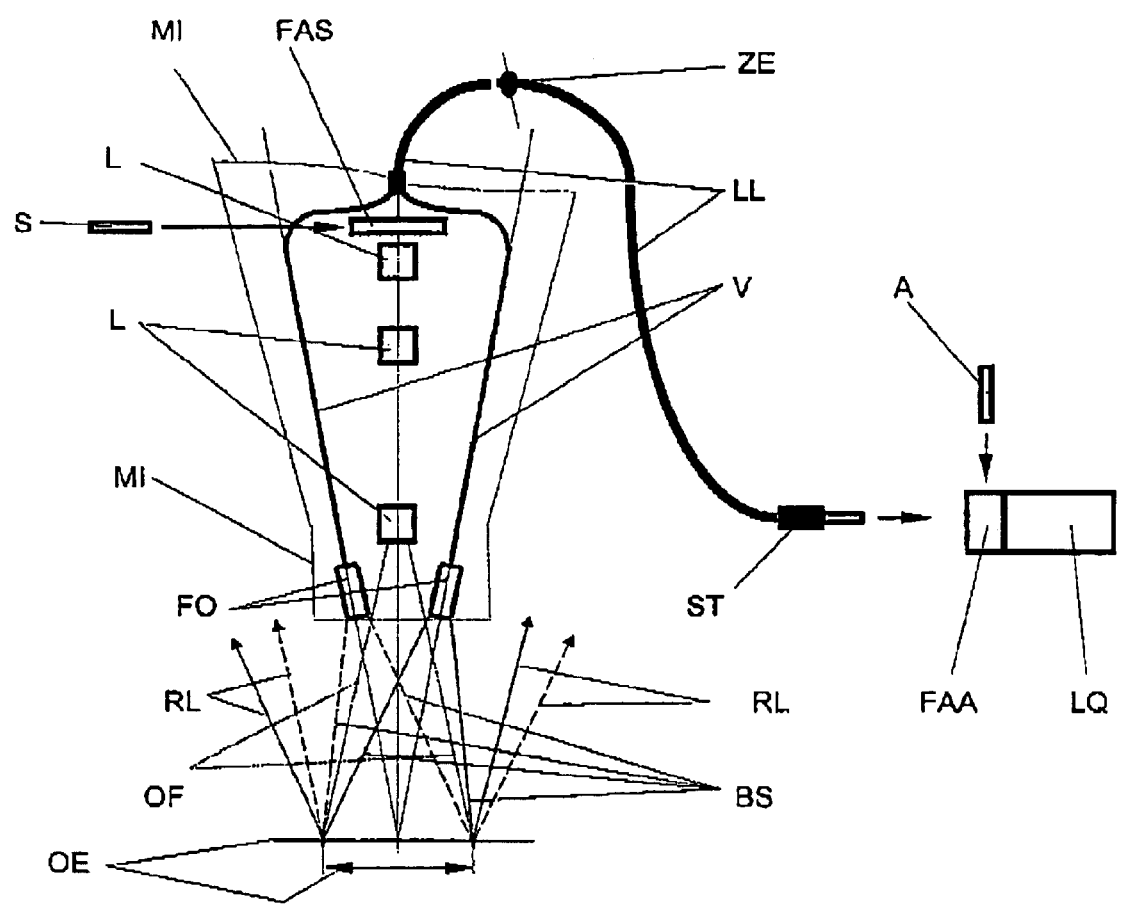
FIG. 6 shows an arrangement for contrasting, for example, fluorescence excitation via the spot illumination device.

This illumination principle is also suitable for microscopy contrast methods. FIG. 6 shows an arrangement for fluorescence excitation via the spot illumination device by way of example. Based on the arrangements described in FIG. 4 or FIG. 5, fluorescence excitation via the spot focusing optics is possible when a filter holder FAA for receiving and changing filters is switched between the light guide end piece ST and the light source LQ in fluorescence excitation for receiving and changing excitation filters A (this filter changing location is already present in many commercially available light sources, especially cold-light sources). Further, when a filter holder for blocking filters FAS is accommodated in the observation channels for changing blocking filters S, very good stereoscopic fluorescence contrast can be achieved in observation, i.e., high-contrast, reflection-free observation is possible in oblique illumination by means of a complete decoupling of illumination channels and observation channels. Suitable light sources for fluorescence excitations in the visible spectral range are halogen cold-light sources (e.g., Schott cold-light source KL 1500) or XBO (xenon very-high-pressure lamps, e.g., XBO 75 W); for UV fluorescence excitations, HBO (mercury very-high-pressure lamps, e.g., HBO 50 W or HBO 100 W) are suitable. A large number of different filter sets (comprising excitation filters and blocking filters) are offered by filter manufacturers and stereo microscope manufacturers for a wide variety of different applications in fluorescence stereo microscopy. The coupling in of light via light guides is advantageous for stereo microscope observation in any spatial direction (e.g., special stands for conservationists) with fluorescence excitation because the above-mentioned very-high-pressure lamps with a rigid coupling to the stereo microscope without light guides would be bothersome for the observer because of its considerable heat development (risk of burn injury when touched); moreover, according to manufacturer's instructions, the very-high-pressure lamps may only be operated in a vertical setup position (these lamps are destroyed when sharply inclined). In the arrangement according to the invention shown in FIG. 6, the light source can remain at a stationary location (for example, fastened to the special stand) and the stereo microscope can be spatially oriented in any manner such that it is connected with the light source via the light guide.

Trial Results

Incident illumination as shown in FIG. 1 to FIG. 4 is integrated in the Zeiss Stemi 1000 base body while maintaining a working distance of 4" (110 mm). The two illumination optical systems—arranged in a north-south direction—were positioned at an angle of 2×8° to realize an oblique incident illumination with extensive decoupling of the observation channels. An image quality which is substantially improved (no bothersome incident light reflections in the upper zoom area) over costly coaxial incident illumination arrangements (minimizing of reflections with polarizing-optic means) was achieved with this arrangement.

The following performance features were determined in the prototype:

a) Bright, homogeneous lighting, illumination with Schott KL 1500e cold-light source; an illumination angle of 2×8° was realized in the prototype; in this way, it was possible to achieve an illumination angle which was substantially smaller than with externally mounted lighting with highly inclined incident light (e.g., Schott point light or ring light: 18°, light 10:35°).

b) Substantially higher-contrast illumination compared with conventional coaxial illumination arrangements with beam splitting (illumination angle 0°, problem of lightening single-reflections which cannot be entirely eliminated in spite of antireflection arrangement) through complete separation of observation and illumination beam paths.

c) By means of complete integration of illumination in the stereo microscope base body, the full working distance (4" with Stemi 1000) is retained: advantage over externally mounted cold-light components by which the working distance is limited and direct, free viewing of observation object is obstructed.

d) All external stereo microscope interfaces are retained (Ø76 mm as internationally standardized receptacle—Ø, receptacle—Ø for external cold-light components, coupling thread for auxiliary systems), accordingly, there are no limitations with respect to the variability which has been achieved.

e) By means of integration, illumination does not need to be tracked in case of changing observation locations (e.g., special stands for MEG applications, scanning of large object fields with cantilever stands, e.g., in textile industries, restoration or conservation stands with optional spatial orientation of the stereo microscope base body) and free viewing of the object was retained.

In view of the extremely confined basic construction of the stereo microscope, the following alternatives are seen for modifying the above-mentioned embodiment examples (FIG. 1 to FIG. 4) with necessary design limitations for spot illumination:

omission of an illumination channel, illumination only with a spot from north or south direction;

instead of a flexible light guide, a light-conducting rod or internally coated light-conducting tube could also be used, at which a flexible standard light guide (e.g., for KL 200) can be coupled in at the upper end so as to be exchangeable (an advantage in case of reasonable transmission losses);

omission of focusing optics, i.e., an object field of ≈160 mm is illuminated (relatively homogeneous illumination ≈ Ø 100 mm) by means of the high light guide aperture (A ≈0.66 with A2 type fiber) at a free working distance of 90 mm; the visible illumination intensity in the viewing field, particularly in the upper zoom area, is then appreciably lower than with an adapted illumination of the object viewing field, but it is still judged sufficient (advantage of large-area illumination of object field with object manipulation and object positioning with the naked eye, i.e., the light is stilled delivered by the Stemi).

While the foregoing description and drawings represent the present invention, it will be obvious to those skilled in the art that various changes may be made therein without departing from the true spirit and scope of the present invention.

What is claimed is:

1. An illumination arrangement for a stereo microscope, in particular, a Greenough type comprising:
at least one illumination channel arranged in a plane essentially orthogonal to a plane of the two observation channels, wherein the illumination is effected at an angle to the optical axis of the microscope by means of at least one light conducts in which the illumination channel is substantially outside the viewing angle so that no direct reflection of illumination light falls into the observation channels and a fluorescence excitation is effected through the light conductor.

2. The illumination arrangement according to claim 1, wherein the illumination is carried out via at least one light guide.

3. The illumination arrangement according to claim 2, wherein the light guide is a flexible glass light guide and/or plastic light guide and/or fluid light guide.

4. The illumination arrangement according to claim 2, wherein the illumination is carried out via the light guide end.

5. The illumination arrangement according to claim 2, wherein the illumination is carried out via illumination optics arranged following the light guide end.

6. The illumination arrangement according to claim 5, wherein the illumination optics are arranged so as to be adjustable and/or displaceable and/or swivelable with respect to the image scale as zoom system.

7. The illumination arrangement according to claim 5, wherein a hand-actuated and/or motor-operated control is provided for adjusting the illumination optics.

8. The illumination arrangement according to claim 5, wherein, when the illumination optics are adjusted as a zoom system, the adjustment being coupled to the adjustment of a microscope zoom system.

9. The illumination arrangement according to claim 5, wherein the illumination optics are arranged as to be displaceable with respect to the image scale as zoom system.

10. The illumination arrangement according to claim 5, wherein the illumination optic are arranged as to be swivelable with respect to the image scale as zoom system.

11. The illumination arrangement according to claim 5, wherein a hand-actuated control is provided for adjusting the illumination optics.

12. The illumination arrangement according to claim 5, wherein a fluorescence excitation is carried out via the illumination channel.

13. The illumination arrangement according to claim 2, wherein the illumination is carried out via a light guide which branches to generate two light channels.

14. The illumination arrangement according to claim 13, wherein the branching takes place entirely within the microscope housing.

15. The illumination arrangement according to claim 13, wherein the branches of the light guide are guided around the observation channels.

16. The illumination arrangement according to claim 2, wherein the light guide is connected with a cold-light source arranged outside of microscope.

17. An illumination arrangement for a stereo microscope, in particular, a Greenough type comprising:
at least one illumination channel arranged in a plane essentially orthogonal to a plane of the two observation channels, wherein the illumination is effected at an angle to the optical axis of the microscope by means of at least one light conductor in which the illumination channel is substantially outside the viewing angle so that substantially no direct reflection of illumination light falls into the observation channels and a fluorescence excitation is effected through the light conductor.

18. An illumination arrangement for a stereo microscope, in particular, a Greenough type comprising:

at least one illumination channel arranged in a plane essentially orthogonal to a plane of the two observation channels, wherein the illumination is effected at an angle to the optical axis of the microscope by at least one light conductor in which the illumination channel is substantially outside the viewing angle so that substantially no direct reflection of illumination light falls into the observation channels.

* * * * *